United States Patent
Siebert

(10) Patent No.: US 6,450,142 B1
(45) Date of Patent: Sep. 17, 2002

(54) AIRFLOW CONSTRICTOR VALVE FOR AUTOMOTIVE CYLINDER HEADS

(76) Inventor: Kenneth Knight Siebert, 60 W. Stone Loop, Apt #2326, Tucson, AZ (US) 85704

( * ) Notice: Subject to any disclaimer, the term of this patent is extended or adjusted under 35 U.S.C. 154(b) by 0 days.

(21) Appl. No.: 09/753,177

(22) Filed: Jan. 3, 2001

(51) Int. Cl.$^7$ ................................................. F02N 3/00
(52) U.S. Cl. ................................................. 123/188.14
(58) Field of Search ..................................... 123/188.14

(56) References Cited

U.S. PATENT DOCUMENTS 3,885,003 A * 5/1975 Kobayashi et al. ......... 123/216
4,858,567 A * 8/1989 Knapp ................... 123/188.14

* cited by examiner

*Primary Examiner*—Noah P. Kamen

(57) ABSTRACT

A cylinder head assembly including a cylinder head with an intake port and a pivot valve disposed within the intake port. The valve is pivotally connected to the intake port such that airflow urges the valve to an open position. The valve also includes a structure for urging the valve toward a closed position.

14 Claims, 2 Drawing Sheets

AIRFLOW CONSTRICTOR VALVE FOR AUTOMOTIVE CYLINDER HEADS

BACKGROUND

1. Field of Invention

This invention generally relates to the field of combustion engine accessories and in particular to a novel constrictor valve for controlling air intake into a cylinder of an engine.

2. Description of the Related Art

The automotive industry has always had the belief that large intake ports on cylinder heads make horsepower at high revolutions per minute (rpm) (above approximately 3000 rpm). However, due to their size, these large ports have air flow that is slow at lower rpm, below 3000 rpm, making them unusable in daily driving on the street, especially when the typical automobile spends most of its time below 3000 rpm. This is due to the fact that when the piston in the engine is moving up and down in the cylinder, a vacuum is created. This vacuum at 800 rpm idle for most automobiles pulls air and fuel from the carburetor or fuel injection system, through the intake port of a cylinder head, down inside the combustion chamber to be ignited to make power to keep the engine continuously working. By varying the size of the intake port, one can change how much fuel and air the engine can take into the combustion chamber. At high rpm and vacuum, the engine is theoretically limited in its power ability by the size of the intake ports. Large ports have large airflow but slow air speed, while small ports have less airflow but faster air speed.

The problem can be illustrated through a simple exercise by taking a certain size straw and sucking a milk shake through it and then comparing the movement of the milkshake with that produced by a larger diameter straw. One will find the suction is less on the larger diameter straw and the milkshake moves slower through the straw. In an analogous fashion, larger ports have a lower flow velocity given the same flow demand.

In more technical terms, an air column of a given mass at a lower velocity has less inertia and potential energy possible, thus negating any ram air effect. The ram air effect is critical for obtaining a complete cylinder filling at low rpm and is just as critical for maximizing volumetric efficiency at high rpm. Accordingly, incomplete cylinder filling at low rpm causes an engine to have poor bottom end power and throttle response. For these reasons, large ports are mainly reserved for racing-type engines only.

The automotive industry logically uses smaller ports for factory cars because smaller ports make a power band more useful to the average motorist on the street. This is due to the faster airflow delivered by smaller ports. Since the speed of the mixture of fuel and air determines how tightly the combustion chamber is packed, the more tightly packed the combustion chamber, the more pressure develops when the mixture is ignited. As a result, the piston is pushed with more force for more power.

To the inventor's knowledge, there is no dual-purpose cylinder head available. Until now, there has been either large ports for racing or small ports for the street. However, by placing a constrictor valve inside a cylinder head intake port (ideally approximately one-half to three-quarters of an inch the size of the port), one can make a large port speed up airflow. But as the rpm increases a constrictor valve would adjust by a vacuum pulling on it, causing it to open up to a large port size at a specific rpm again. Accordingly, one achieves a low rpm throttle response and high rpm horsepower all in one. Basically, a cylinder head that was believed to work only at high rpm can be used at lower rpm also.

BRIEF SUMMARY OF THE INVENTION

The invention generally relates to a device for increasing airflow speed through an inlet port of an automotive cylinder head. More specifically, the invention relates to a pivot valve for an intake port of a cylinder head that is balanced such that the pivot valve is relatively more open during greater airflows and more closed during lesser airflows.

It is an object of the invention to provide more power capability from virtually any internal combustion engine that uses intake ports such as lawnmowers, gas-powered weed eaters, generators, motorboat engines, etc.

A second object of the invention is to eliminate the need for more costly and less reliable devices which speed airflow such as turbochargers and superchargers.

Another object of the invention is to provide a valve that responds to airflow through an intake port of a cylinder head such that airflow speed is increased at lower rpm's.

In accordance with these and other objectives, the invention features a valve that is pivotally attached inside the intake of a cylinder head and means for urging the valve to a closed position such as by a counterweight or spring.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only some of the various ways in which the invention may be practiced.

DETAILED DESCRIPTION OF THE PREFERRED EMBODIMENTS

The invention relates to a pivot valve for an intake port of a cylinder head. More particularly, the pivot valve is designed such that it is relatively more open during greater airflows and more closed during lesser airflows, thus controlling airflow velocity into the cylinder.

Figure 1:
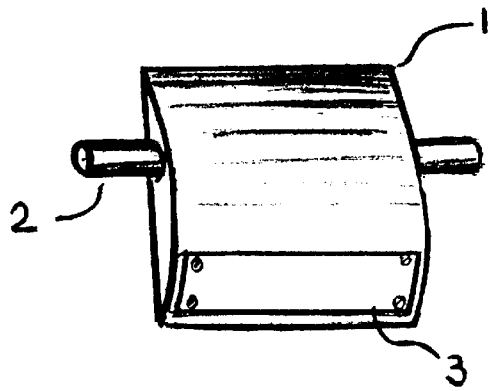
FIG. 1 is a schematic view of a preferred embodiment of the valve of the invention.
Figure 2:
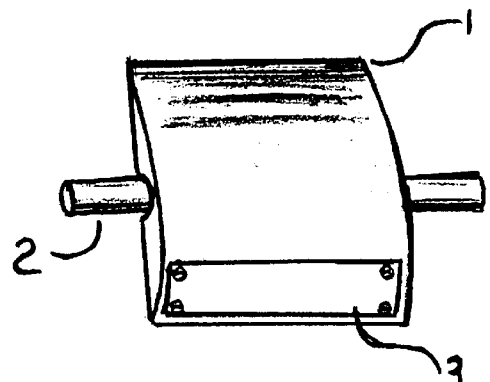
FIG. 2 is a schematic view of the valve of FIG. 1 showing a variation in the placement of the pivots.

Embodiments of the constrictor valve of the present invention are illustrated in FIGS. 1 and 2. The valve 1 has a rectangular shape to fit most intake ports of engines, past or presently produced. However, the valve 1 can be any shape to accommodate the intake port of any engine. In the preferred embodiment, the valve 1 is made of aluminum. However, the valve 1 can be made of other materials that can withstand the heat and stress of being inside an intake port, i.e., brass, stainless steel, titanium, etc.

There is a pivot point 2 disposed upon each intermediate side 3 of valve 1. Each pivot 2 is ideally 5 mm in diameter and approximately 16 mm in length, with the ideal size for this embodiment of the valve being approximately 38 mm wide, 45 mm long (depending on size of intake port), and 2 mm thick. The outer four corners, which form a downstream edge 4 and an upstream edge 5, are rounded off as well as the bottom of the valve 1 to make the valve more aerodynamic with less friction to air and fuel flow. Moreover, in order to urge the valve 1 to a closed position during an absence or low velocity of airflow, a counter weight 6 is disposed near the downstream edge 4.

Figure 3:
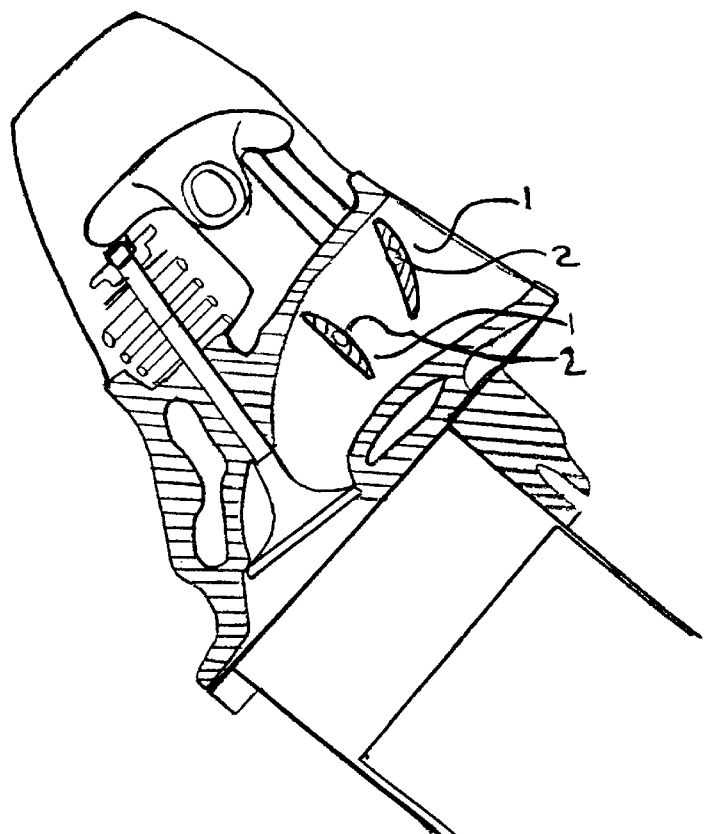
FIG. 3 is a cross-sectional view of a cylinder head assembly showing the placement of two replicas of the valve illustrated in FIG. 1.

The manner in which the constrictor valve operates is best illustrated in the context of a cylinder head assembly as shown in FIG. 3. By way of example, typically a piston 7, which is housed within a cylinder 8, receives air and fuel for combustion from a cylinder head assembly 10. Usually, the parts found within or around the cylinder head 10 include an intake valve 12, an intake valve spring 14, and a rocker arm 16 and push rod 18 toped by a valve cover 20. Air enters the cylinder head 10 through intake port 22.

For the particular embodiment of the invention shown in FIG. 3, two valves 1 sit inside the intake port 22, and are held upright in a closed position by an attached counterweight 6 (see FIGS. 1 and 2) and gravity. Two or more of the valves may be used for especially large intake ports in which "swirling" or other effects may cause airflow to slow in route to the cylinder. When the engine is started, a vacuum is induced inside the intake port 22. As vacuum increases with the engine rpm, the valve 1 is pulled open more and pivots on the two pivot points 2. Conversely, as vacuum decreases, it urges toward the upright (closed) position once again. Thus, the valve 1 is made "self-adjusting" by the pivots 2 and counterweights in that the position of the valve is in response to the relative airflow through the intake port 22.

Figure 4:
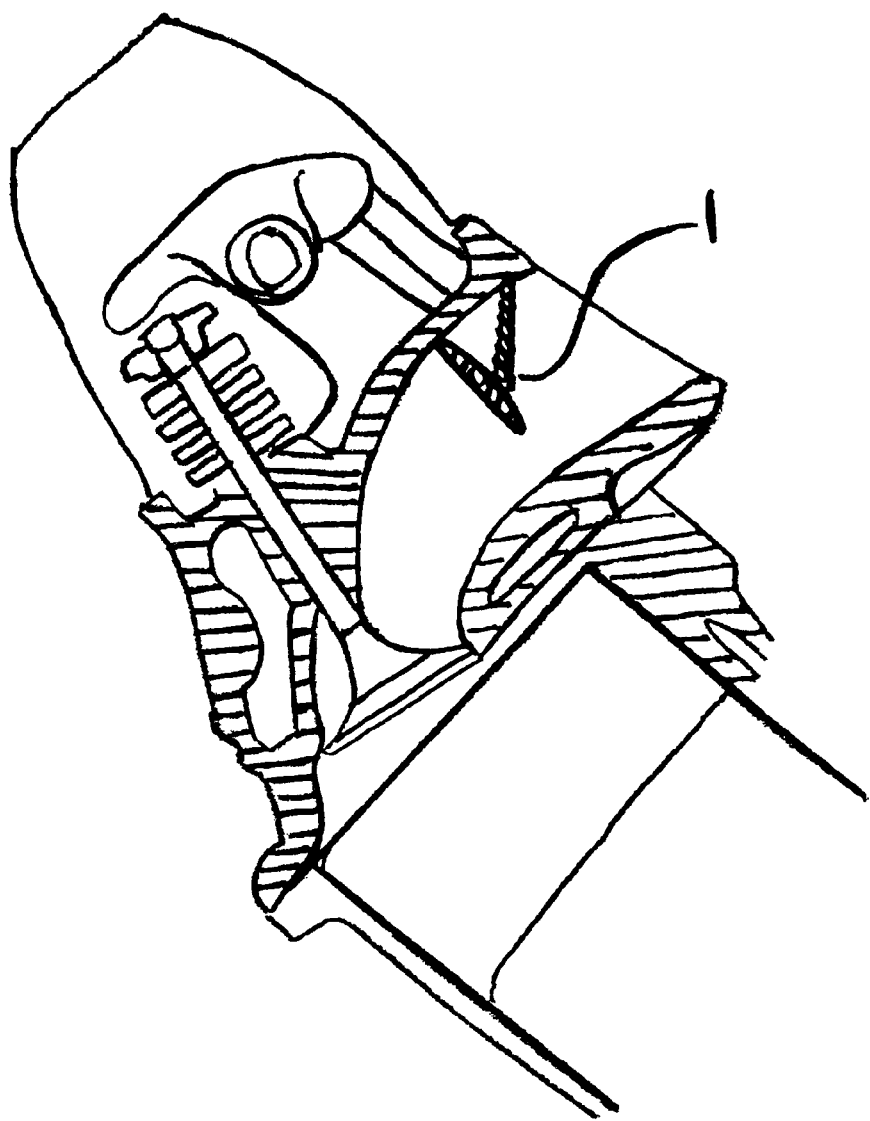
FIG. 4 is a cross-sectional view of a cylinder head assembly showing the placement of an alternative valve embodiment.

There are other possibilities regarding the means of self-adjustment. FIG. 4 illustrates a constrictor valve 1 using a spring 24 in place of a counterweight for returning the valve 1 back to the upright (closed) position during times of relatively low (or no) airflow.

Accordingly, the reader will see that the constrictor valve of the invention provides a simple means to increase air/fuel flow speed in a cylinder head in an easy and economical way, and especially, when compared to the other means to speed airflow currently in manufacture, i.e., superchargers, turbo chargers.

Although the description above contains many specifics, these should not be construed as limiting the scope of the invention but as merely providing illustrations of some of the presently preferred embodiments of this invention. For example, the valve can have other shapes such as rectangular, oval, trapezoid, etc.; or the valve could have linkage arms or a spring connected to it. Thus, the scope of the invention should be determined by the appended claims and their legal equivalents, rather than by the examples given.

I claim:

1. A cylinder head assembly, comprising:
   a) a cylinder head with an intake port and a pivot valve, wherein the pivot valve includes an upstream edge, a downstream edge, and intermediate sides,
   b) means for pivotally connecting said intermediate sides of the valve to the intake port such that airflow urges the valve to an open position; and
   c) means for urging the valve toward a closed position.

2. The assembly of claim 1, wherein said pivot valve is substantially convex in cross-section.

3. The assembly of claim 1, wherein said means for urging the valve toward a closed position comprises a counterweight.

4. The assembly of claim 1, wherein said means for urging the valve toward a closed position comprises a spring.

5. A cylinder head assembly, comprising:
   a) a cylinder head with an intake port and a pivot valve, wherein the pivot valve includes an upstream edge, a downstream edge, and intermediate sides; and
   b) means for pivotally connecting said intermediate sides of the valve to the intake port in asymmetric weight disposition such that airflow urges the valve to an open position.

6. The assembly of claim 5, wherein said pivot valve is substantially convex in cross-section.

7. The assembly of claim 5, wherein the pivot valve further includes a means for urging said valve toward a closed position.

8. The assembly of claim 7, wherein said means for urging the valve toward a closed position comprises a counterweight.

9. The assembly of claim 7, wherein said means for urging the valve toward a closed position comprises a spring.

10. A cylinder head assembly, comprising:
    a) a cylinder head with an intake port and a pivot valve, wherein the pivot valve includes an upstream edge, a downstream edge, and intermediate sides; and
    b) means for pivotally connecting said intermediate sides of the valve to the intake port such that airflow urges the valve to an open position,
    wherein said intermediate sides further include an upstream portion facing the upstream edge and a downstream portion facing the downstream edge and said means for pivotally connecting is disposed on the intermediate sides such that said upstream and downstream portions have unequal weight.

11. The assembly of claim 10, wherein said pivot valve is substantially convex in cross section.

12. The assembly of claim 10, wherein the pivot valve further includes a means for urging said valve toward a closed position.

13. The assembly of claim 12, wherein said means for urging the valve toward a closed position comprises a counterweight.

14. The assembly of claim 12, wherein said means for urging the valve toward a closed position comprises a spring.

* * * * *